(12) United States Patent
Sung

(10) Patent No.: US 6,182,599 B1
(45) Date of Patent: Feb. 6, 2001

(54) NONELECTRIC BRAKE WARNING DEVICE FOR VEHICLE

(76) Inventor: Jui-Chan Sung, 15, Lane 49, Her Tzuoh St., Taichung (TW)

(*) Notice: Under 35 U.S.C. 154(b), the term of this patent shall be extended for 0 days.

(21) Appl. No.: 09/182,485

(22) Filed: Oct. 30, 1998

(51) Int. Cl.[7] ............... B60Q 1/26; G09F 7/02; G09F 21/04
(52) U.S. Cl. ............... 116/35 R; 40/492; 40/590
(58) Field of Search ................ 116/28 R, 30, 116/35 R, 36, 46, 51, 63 R, 69 P, 306, 307, 309, 316; 40/492, 493, 590

(56) References Cited

U.S. PATENT DOCUMENTS

| | | | |
|---|---|---|---|
| D. 414,816 | * 10/1999 | Saunders | 40/590 |
| 1,016,575 | * 2/1912 | Meinhardt | 116/316 |
| 1,340,081 | * 5/1920 | Rabbitt | 116/51 |
| 1,366,739 | * 1/1921 | McClure | 116/51 |
| 1,630,730 | * 5/1927 | Daugherty | 116/12 |
| 1,840,213 | * 1/1932 | Schon | 116/46 |
| 2,787,975 | * 4/1957 | Dunn | 116/63 R |
| 3,491,717 | * 1/1970 | Vincent et al. | 116/307 |
| 3,982,771 | * 9/1976 | Tropeano | 116/35 R |
| 4,063,377 | * 12/1977 | Hukill | 40/68 |
| 4,318,238 | * 3/1982 | Macarle, Jr. | 116/63 P |
| 5,257,020 | * 10/1993 | Morse | 340/908.1 |
| 5,680,121 | * 10/1997 | Shiozaki et al. | 340/908.1 |
| 5,918,924 | * 7/1999 | Cowan | 40/591 |

FOREIGN PATENT DOCUMENTS

| | | | |
|---|---|---|---|
| 530055 | * 12/1972 | (CH) | 116/309 |
| 2306490 | * 8/1973 | (DE) | 116/306 |
| 414004 | * 6/1946 | (IT) | 116/306 |
| 961091 | * 6/1964 | (WO) | 116/63 R |

OTHER PUBLICATIONS

16293. Faulkners' complete specification, 1909.*
176,414. Complete specification, unknown.*
362,158. Complete specification, unknown.*
305,062. Complete specification, unknown.*
323,057. Complete specification, unknown.*

* cited by examiner

Primary Examiner—G. Bradley Bennett
Assistant Examiner—Gail Verbitsky
(74) Attorney, Agent, or Firm—Raymond Y. Chan; David and Raymond

(57) ABSTRACT

A nonelectric brake warning device for vehicle is fastened at the rear end of various motor vehicles, motorcycle or bicycle for traffic safety. The warning device consists of a main body which is provided in the direction towards the rear end of the vehicle with a plurality of arresting pieces arranged equidistantly, and one or more movable display pieces which are provided in the inner side thereof with a rolling cylinder capable of rolling back and forth in the main body for driving the movable display pieces. The rolling cylinder is provided with two shafts by which the rolling cylinder slides in the slide slot of a movable angular frame which can be adjustably inclined. When the vehicle in motion is stopped or decelerated, the inertia drives the display pieces to displace up or down in the main body to alert the operators of those vehicles which are following the vehicle in question. The movable display pieces and the arresting pieces are arranged alternately so as to enable the display pieces to bring about the warning effect with out the use of electricity.

2 Claims, 7 Drawing Sheets

NONELECTRIC BRAKE WARNING DEVICE FOR VEHICLE

FIELD OF THE INVENTION

The present invention relates generally to a nonelectric brake warning device for a vehicle, and more particularly to a nonelectric warning device which is mounted at the rear of a motor vehicle, motorcycle, or bicycle for safeguarding the traffic at such time when the brake of the motor vehicle, motorcycle, or bicycle in motion is applied. The device is effected by the inertia action and can be also mounted in the interior or other parts of the vehicle.

BACKGROUND OF THE INVENTION

The convention vehicle warning device, such as the third brake warning light or similar auxiliary warning light, must be mounted in a vehicle and dependent on the vehicles electricity for its operation. The nonelectric vehicle, such as bicycle and pedicab, can not be therefore equipped with such electric warning device. Without the warning device, the bicycle or pedicab is rather vulnerable to traffic accident, especially at night or in a rainy day when the visibility is poor.

The conventional electric brake warning device for motor vehicles has drawbacks which are described hereinafter.

The conventional electric brake warning device is dependent on electricity for its operation and must be provided with a light-emitting element which can be damaged or out of order at any time. Unless a new light-emitting element is immediately available, the damaged or worn-out light-emitting element can not be replaced so as to keep the warning device in a working condition.

With the exception of the third brake warning light, the conventional brake warning device is the brake warning light mounted at one side of the tail light. Other parts of the vehicle are devoid of the brake warning device. For example, the cargo, such as steel bars, timber, or similar oversized article, is not provided with the warning device. Instead, the cargo is often tagged with a red or vivid ribbon as a warning device. The red or vivid ribbon is a rather primitive and ineffective warning device.

SUMMARY OF THE INVENTION

The primary objective of the present invention is to provide a nonelectic brake warning device which is mounted at the rear end of a motor vehicle or bicycle such that the device is effected by the inertia action brought about by the braking or decelerating of the motor vehicle or bicycle in motion, so as to alert the operators of the motor vehicles or bicycles following that motor vehicle or bicycle. The device of the present invention can be mounted in the interior of the vehicle or any part of the outside of the vehicle and can be operated without electricity.

DETAILED DESCRIPTION OF THE INVENTION

Figure 1:
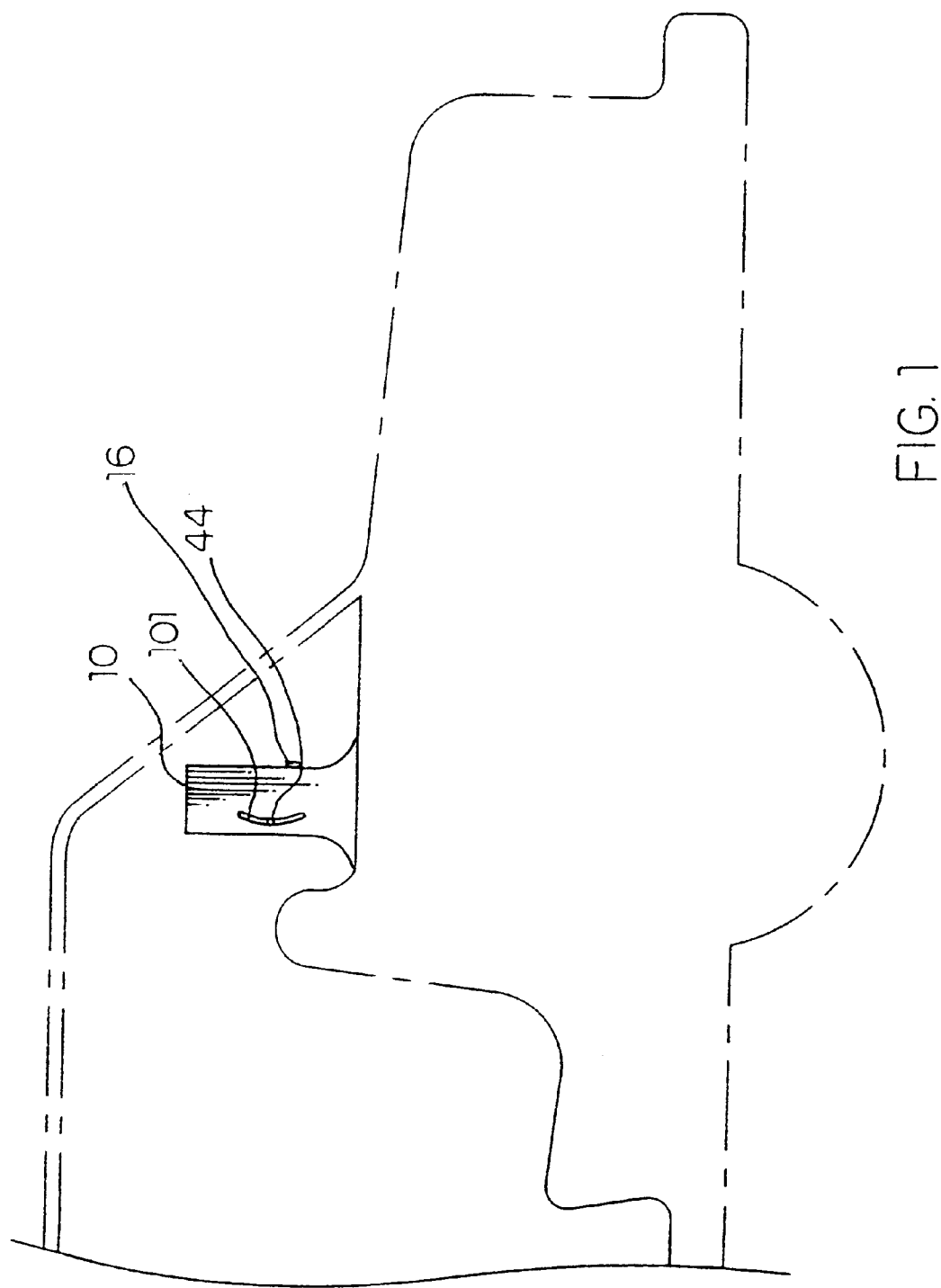
FIG. 1 shows a side schematic view of the present invention.
Figure 2:
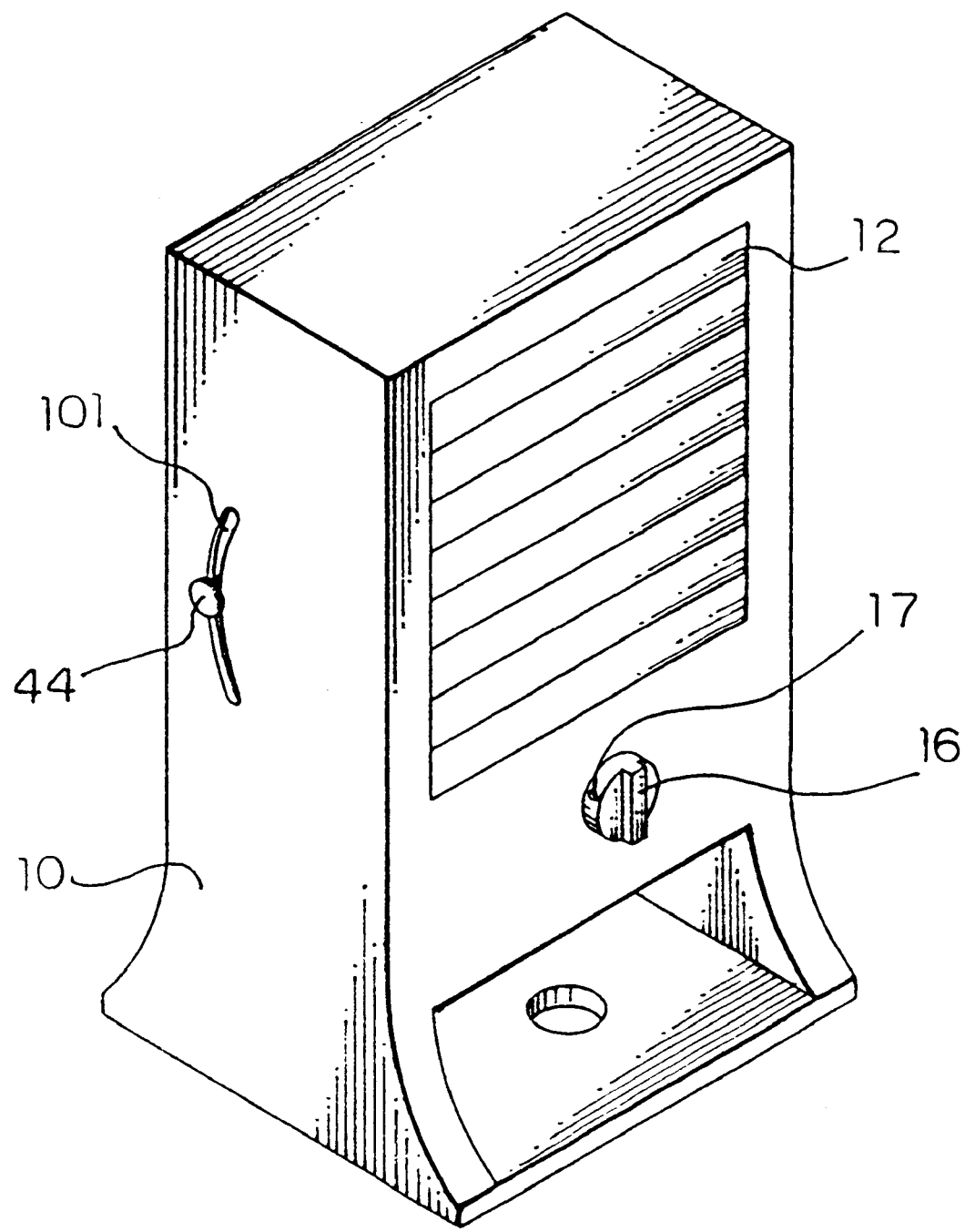
FIG. 2 shows a perspective view of the present invention.
Figure 3:
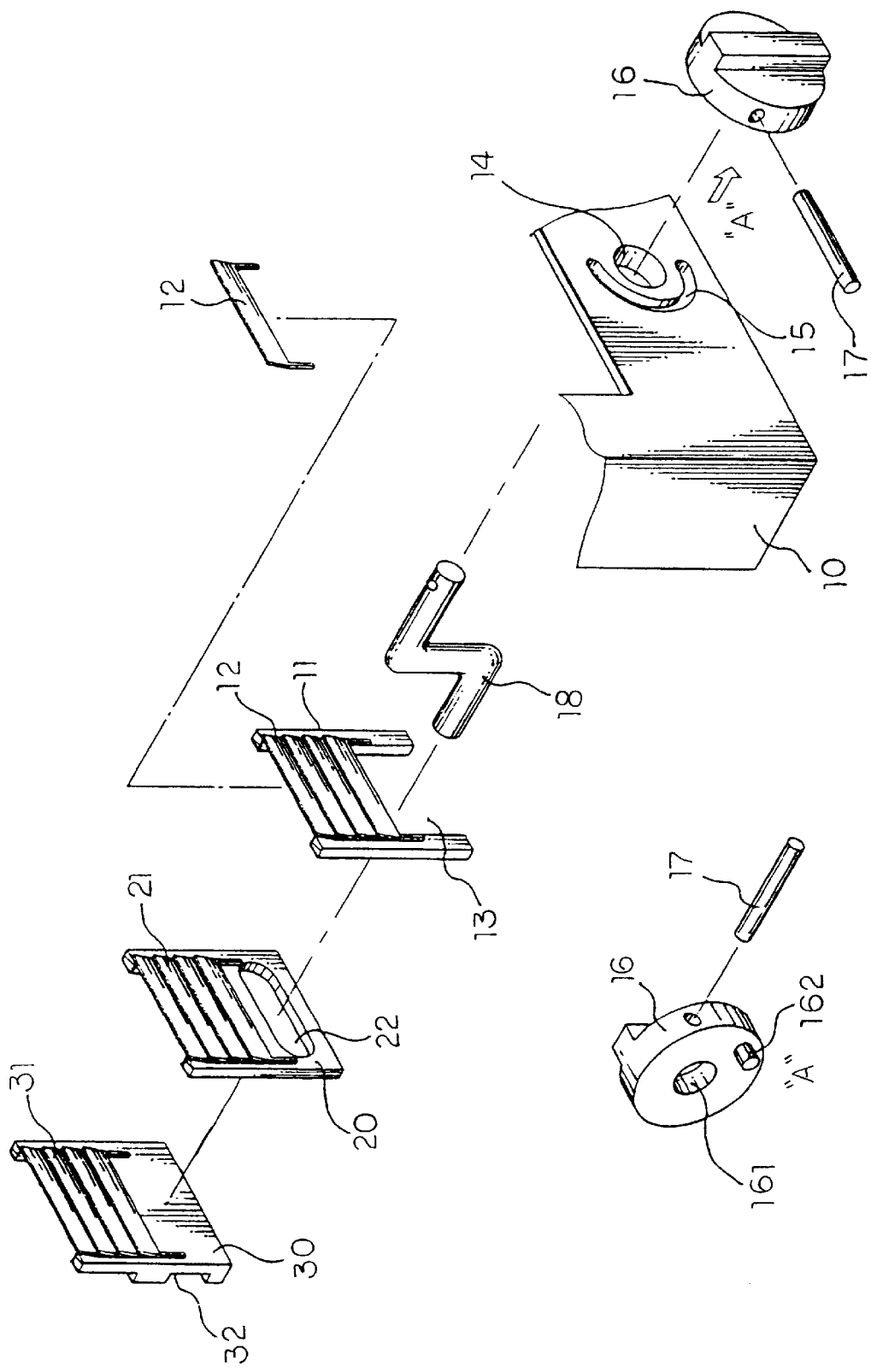
FIG. 3 shows a partial exploded view of the present invention.
Figure 5:
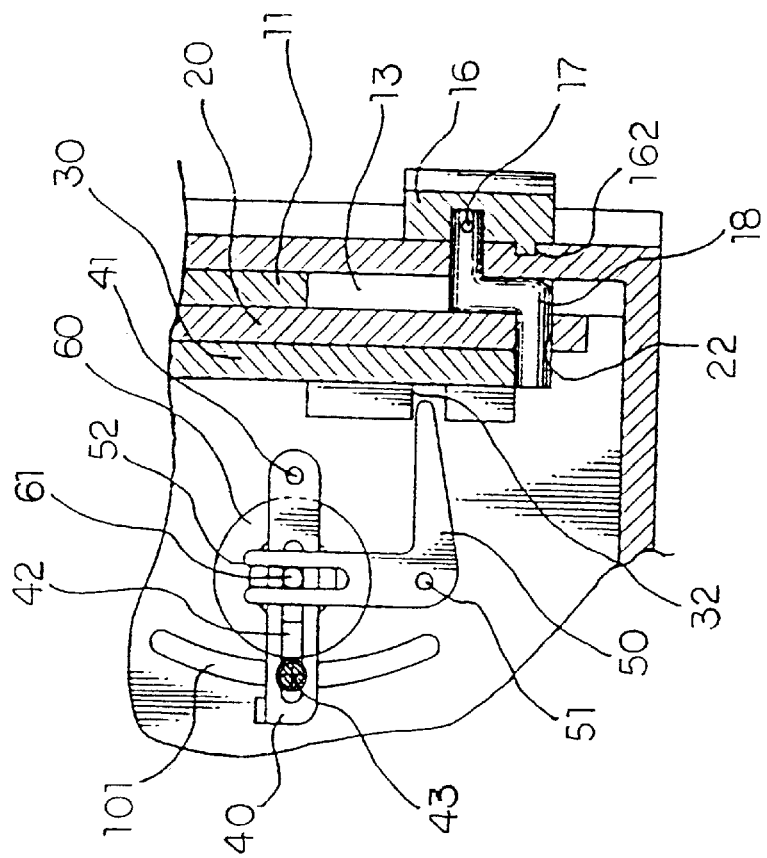
FIG. 5 shows a sectional view of the present invention in combination.
Figure 4:
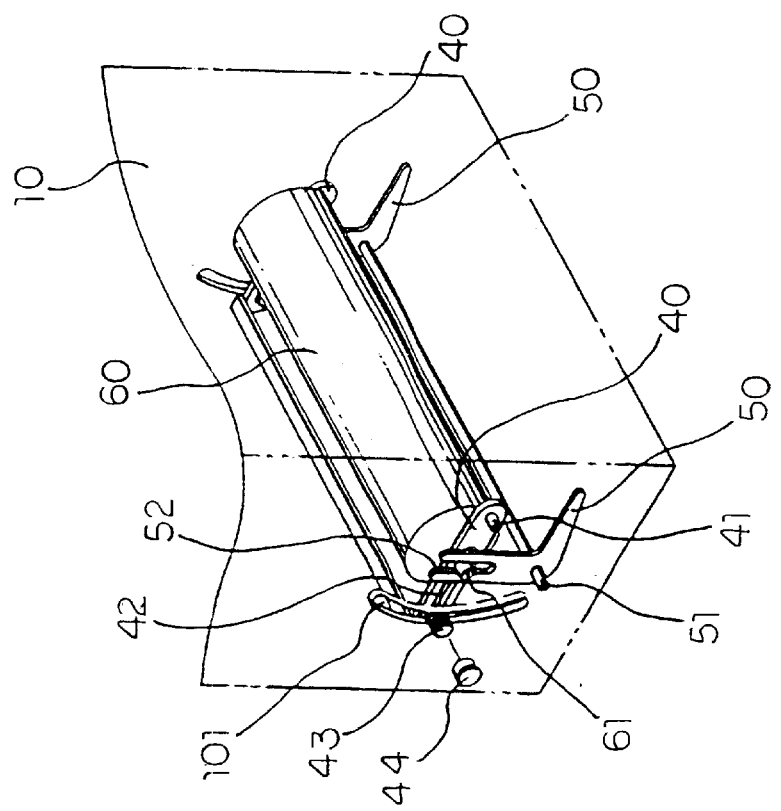
FIG. 4 shows another partial exploded view of the present invention.

As shown in FIGS. 1–6, the present invention comprises the components which are described hereinafter.

A main body 10 is of a hollow box like construction and is provided in one side thereof with a fastening fence 11 which is in turn provided with a plurality of cross bars 12 arranged equidistantly. The cross bars 12 are made of a pliable material. The main body 10 is further provided with a recessed portion 13, a button hole 14, and an arcuate locating recess 15.

A rotary button 16 is located at the outer side of the button hole 14 and provided axially with a shaft hole 161. The rotary button 16 is further provided with a protrusion 162 corresponding in location to and engage able with the locating recess 15.

A curved shaft 18 has one end which is located in the recessed portion 13 of the fastening fence 11 and a long hole 22 of a first display piece 20, and other end which is located in the shaft hole 161 of the rotary button 16 via the button hole 14 of the main body 10 by a pin 17 normal to the axial direction of the other end of the curved shaft 18.

The first display piece 20 is movably located behind the fastening fence 11 such that the first display piece 20 is capable of moving up and down in the main body 10. The first display piece 20 is provided with a plurality of cross bars 21 which are arranged equidistantly and made of a pliable material. The cross bars 21 of the first display piece 20 are stacked alternately with the cross bars 12 of the fastening fence 11. The cross bars 21 are coated with the identification patterns, words, symbols, such as parking", out of order", stop", etc. The coat of the cross bars 21 is capable of reflecting light.

A second display piece 30 is movably located behind the first display piece 20 such that the second display piece 30 is capable of moving up and down in the main body 10. The second display piece 30 is provided with a plurality of cross bars 31 which are made of a pliable material and arranged equidistantly such that the cross bars 31 of the second display piece 30 are stacked alternately with the cross bars 21 of the first display piece 20. The second display piece 30 is provided at the lower end of the rear side thereof with a pushed portion 32. The cross bars 31 are marked with the identification patterns, words, symbols, such as parking", out of order", stop", etc. The cross bars 31 are marked with a coating capable of reflecting light.

The fastening fence 11, the first display piece 20, and the second display piece 30 are provided with an adjustable slot seat 40, which is located on the main body 10 by a locating shaft 41 and provided with an adjusting shaft bolt 43 which is engaged with a nut 44 via an angle adjusting slot 101. The adjusting shaft bolt 43 is capable of displacing freely in the angle adjusting slot 101. Located between the locating shaft 41 and the adjusting shaft bolt 43 is a hollow long strip like movable slot 42.

A moving block 50 of an L-shaped construction is provided at the midsection thereof with a pivot 51 by which the moving block 50 is located in the main body 10 such that the moving block 50 is capable of swiveling back and forth on the pivot 51. The moving block 50 is provided with a forked portion 52.

A rolling cylinder 60 is provided with two shaft s 61 which a reengaged with the forked potion 52 of the moving block 50 via the movable slot 42 of the adjustable slot seat 40 such that the rolling cylinder 60 is capable of driving the moving block 50 to swivel while the rolling cylinder 60 is sliding back and forth in the movable slot 42 of the adjustable slot seat 40.

Figure 6:
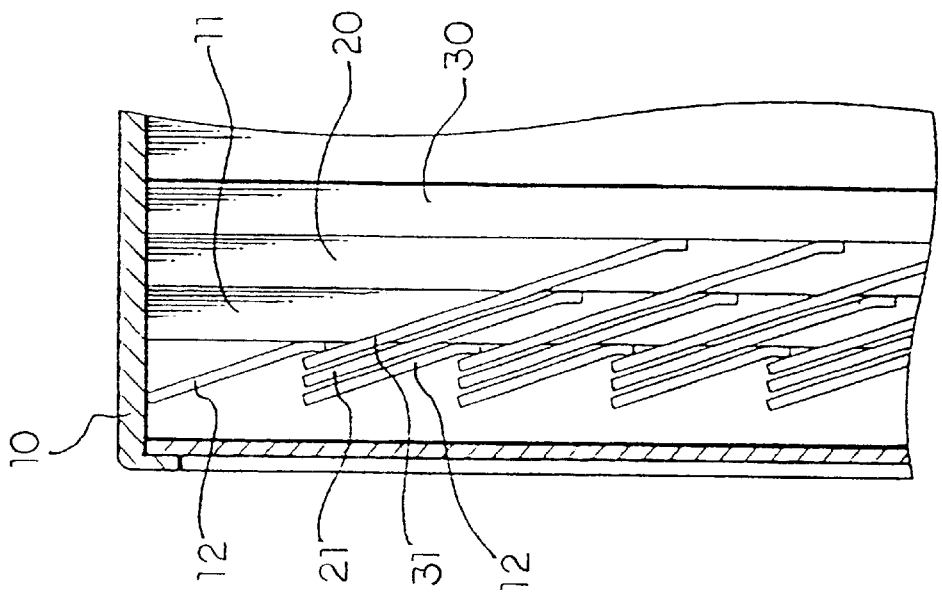
FIG. 6 shows a schematic view of the present invention at work at the time when the vehicle is accelerated or cruising at a constant speed.
Figure 7:
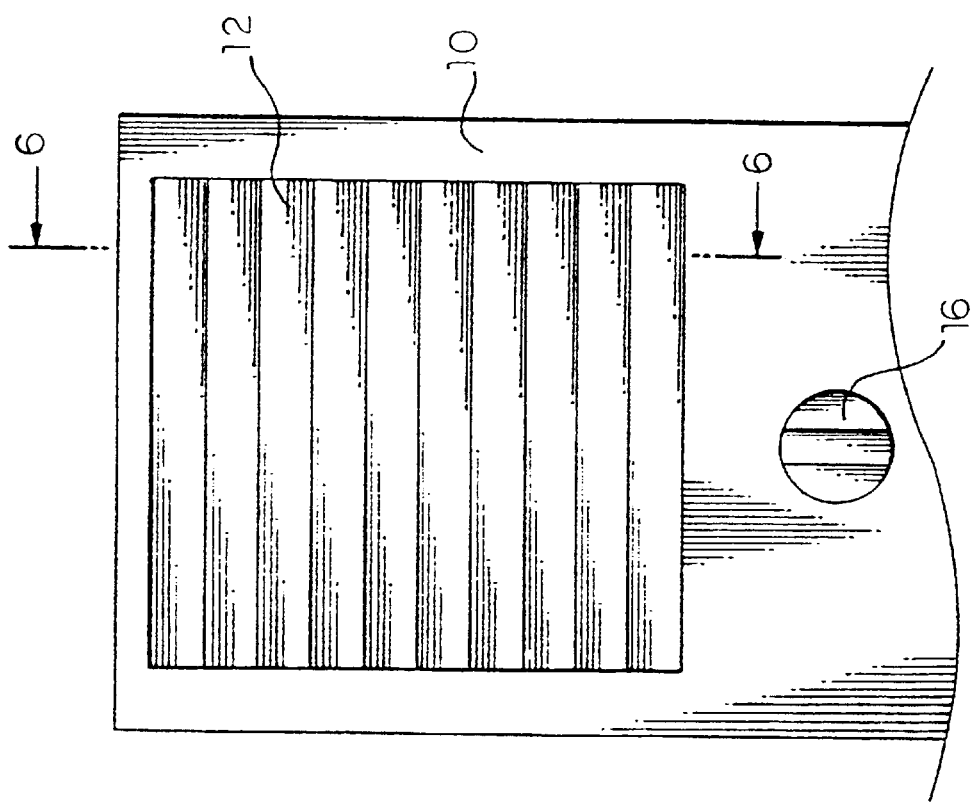
FIG. 7 shows a side view of FIG. 6

In combination, the adjusting shaft bolt 43 of the adjustable slot seat 40 is slightly lower than the locating shaft 41. When the vehicle is cruising at a constant speed, the rolling cylinder 60 is caused to displace towards the locating shaft 41 by the inertia force such that the two shafts 61 of the rolling cylinder 60 are held by the forked portion 52 of the moving block 50, and that the forked portion 52 of the moving block 50 is forced to displace towards the rear side of the vehicle, thereby resulting in the downward displacement of the lower end of the moving block 50. As a result, the second display piece 30 and the cross bars 31 are caused to displace downwards along with the moving block 50 such that the cross bars 12, 21 and 31 are stacked and aligned, and that only the cross bars 12 of the fastening fence 11 are visible, as shown in FIGS. 6 and 7.

Figure 8:
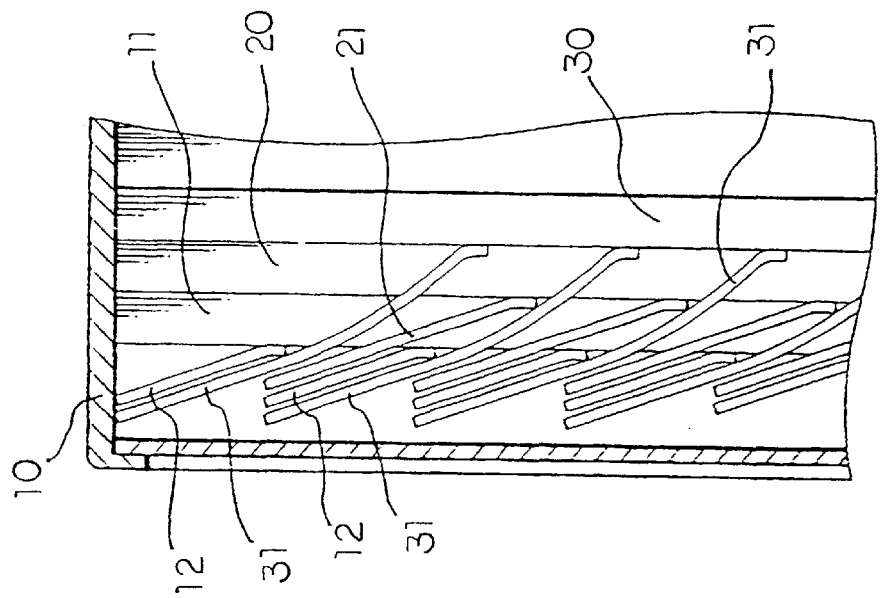
FIG. 8 shows a schematic view of the rolling cylinder of the present invention in forward motion at the time when the vehicle is in the braking state.
Figure 9:
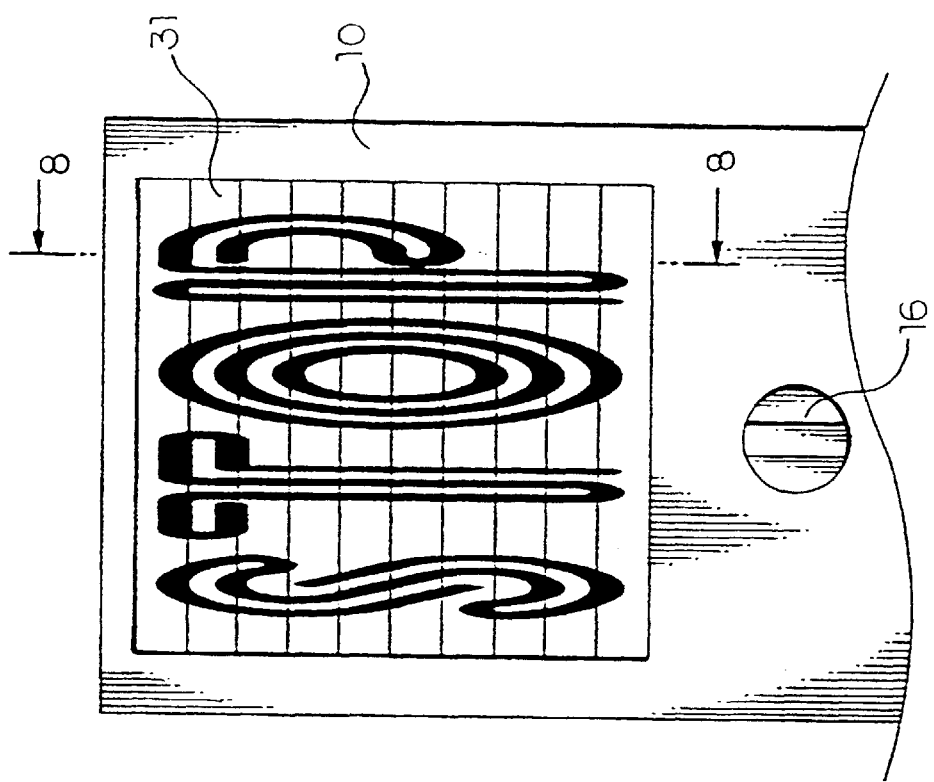
FIG. 9 shows a side view of FIG. 8

When the vehicle in motion is slowed down or stopped, the rolling cylinder 60 is forced by inertia to move in the movable slot 42 in the direction in which the vehicle is in motion. The forked portion 52 of the moving block 50 is thus lifted to urge the pushed portion 32 of the second display piece 30. As a result, the cross bars 31 of the second display piece 30 are lifted to be visible to the naked eye from the outside of the main body 10, as shown in FIGS. 8 and 9.

Figure 10:
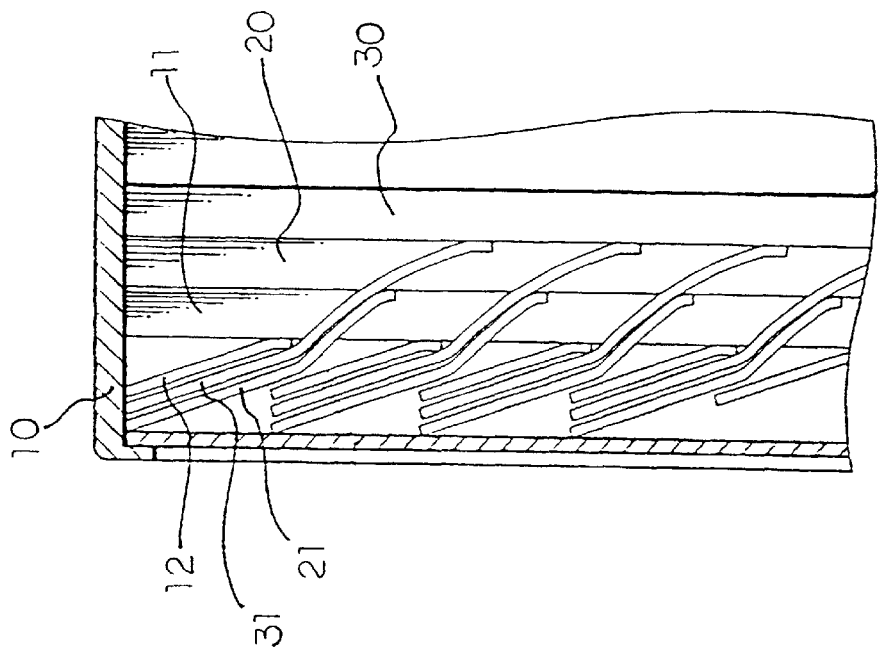
FIG. 10 shows a schematic view of the manual control of the present invention at the time when the vehicle is out of order.
Figure 11:
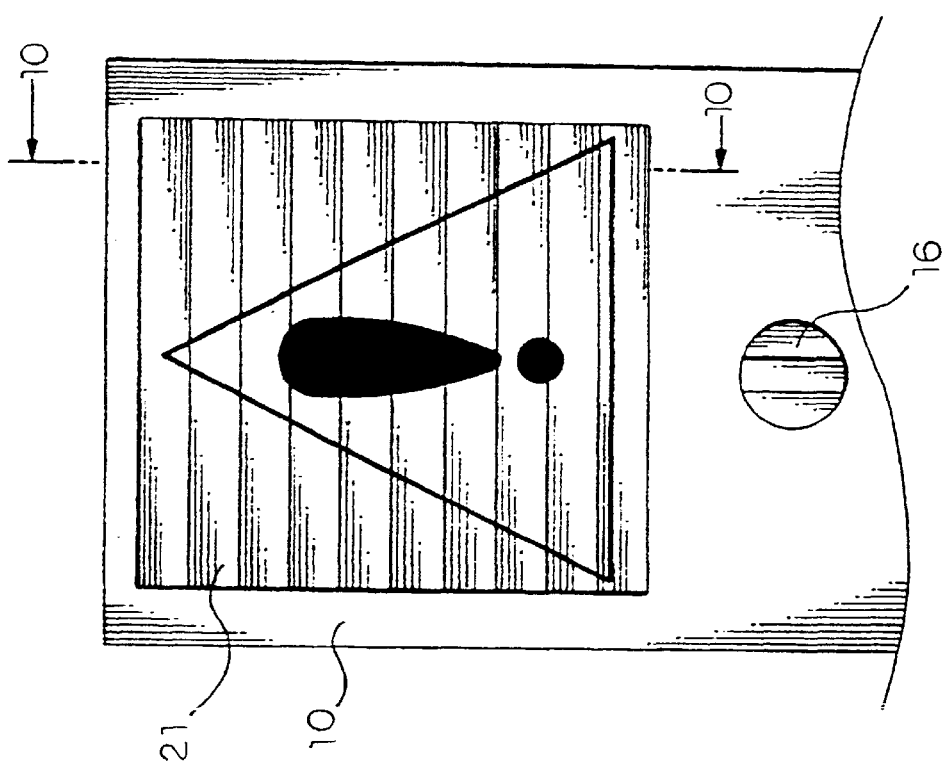
FIG. 11 is a side view of FIG. 11

When the disabled vehicle must be parked for a prolonged period of time, the rotary button 16 is rotated to actuate the curved shaft 18 to push simultaneously the first display piece 20 and the second display piece 30 such that the cross bars 21 and 31 are stacked and lifted, and that the cross bars 21 are visible, as shown in FIGS. 10 and 11.

The present invention has advantages over the prior art, which are described hereinafter.

The working mechanism of the present invention is relatively simple in design in that it is brought about by inertia.

The present invention can be mounted on any part of a vehicle such that the working mechanism of the present invention is brought about without the use of electricity, and that the display portions of the present invention are capable of reflecting light to bring about the warning effect.

The present invention can be mounted on a vehicle such that the display portions of the present invention are readily visible at any angle.

What is claimed is:

1. A nonelectric brake warning device for a vehicle, comprising:

- a main body of a hollow box like construction and provided in one side thereof a fastening fence having a plurality of cross bars which are made of a pliable material and arranged equidistantly, said main body further provided with a recessed portion, a button hole, and an arcuate locating recess;
- a rotary button secured to said button hole and provided in a center thereof with a shaft hole, a protrusion corresponding in location to and engaged with said arcuate locating recess;
- a curved shaft having one end located in said recessed portion of said fastening fence and a long hole of a first display piece, said curved shaft further having other end located in said shaft hole of said rotary button via said button hole of said main body by a pin perpendicular to an axial direction of said other end of said curved shaft;
- said first display piece movable located behind said fastening fence such that said first display piece is capable of moving up and down in said main body, said first display piece being provided with a plurality of cross bars which are made of a pliable material and arranged equidistantly, said cross bars of said first display piece being stacked alternately with said cross bars of said fastening piece, said cross bars of said first display piece being marked with traffic related patterns, words and symbols;
- a second display piece movably located behind said first display piece such that said second display piece is capable of moving up and down in said main body, said second display piece provided with a plurality of cross bars which are made of a pliable material and arranged equidistantly in such a manner that said cross bars of said second display are stacked alternately with said cross bars of said first display piece, said second display piece further provided with a pushed portion at a lower end of a rear side thereof, said cross bars of said second display piece being marked with traffic related patterns, words and symbols;
- an adjustable slot seat fastened with said fastening fence, said first display piece, and said second display piece, said slot located on said main body by a locating shaft and provided with an adjusting shaft bolt which is engaged with a nut via an angle adjusting slot and is capable of displacing freely in said angle adjusting slot, said locating shaft and said adjusting shaft bolt provided there between with a movable slot;
- a moving block of an L-shaped construction and provided in a midsection thereof with a pivot by which said moving block is located in said main body such that said moving block is capable of swiveling back and forth on said pivot, said moving block further provided with a forked portion; and
- a rolling cylinder provided with two shafts which are engaged with said forked portion of said moving block via said movable slot of said adjustable slot seat.

2. The nonelectric brake warning device, as defined in claim 1, wherein said patterns, words and symbols marked on said cross bars of said first display piece and said second display piece are coated with a light reflecting coat.

* * * * *